United States Patent
Lorenz et al.

(10) Patent No.: US 10,267,268 B2
(45) Date of Patent: Apr. 23, 2019

(54) PUMP DEVICE FOR BUILDING UP PRESSURE IN A FUEL TANK

(71) Applicant: Robert Bosch GmbH, Stuttgart (DE)

(72) Inventors: Marko Lorenz, Grossbottwar (DE); Andreas Posselt, Muehlacker (DE); Andreas Gutscher, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/823,203

(22) Filed: Nov. 27, 2017

(65) Prior Publication Data

US 2018/0156163 A1 Jun. 7, 2018

(30) Foreign Application Priority Data

Dec. 5, 2016 (DE) .................. 10 2016 224 171

(51) Int. Cl.
| | |
|---|---|
| *F02M 37/04* | (2006.01) |
| *F02M 25/08* | (2006.01) |
| *B60K 15/035* | (2006.01) |
| *B60K 15/03* | (2006.01) |

(52) U.S. Cl.
CPC ........ *F02M 25/0818* (2013.01); *B60K 15/035* (2013.01); *B60K 15/03519* (2013.01); *B60K 2015/03256* (2013.01)

(58) Field of Classification Search
CPC ........... F02M 25/0818; F02M 37/0076; F02M 37/0082; F02M 37/0023; F02M 37/08; B60K 15/035
USPC ........ 123/495, 497, 509, 510, 511, 522, 523
See application file for complete search history.

(56) References Cited

U.S. PATENT DOCUMENTS

| | | | | |
|---|---|---|---|---|
| 6,722,348 B2* | 4/2004 | Nagasaki | ........... | F02M 25/0818 123/198 D |
| 7,004,013 B2* | 2/2006 | Kobayashi | ......... | F02M 25/0809 73/49.7 |
| 8,560,167 B2* | 10/2013 | Jentz | ..................... | G01M 3/025 180/441 |
| 8,602,003 B2* | 12/2013 | Schoenfuss | ........ | F02M 25/0818 123/516 |
| 8,770,013 B2* | 7/2014 | Kato | ................... | G01M 3/3263 73/40.5 R |

(Continued)

FOREIGN PATENT DOCUMENTS

DE 197 35 549 B4 2/2008

*Primary Examiner* — Hai H Huynh
(74) *Attorney, Agent, or Firm* — Maginot, Moore & Beck LLP

(57) ABSTRACT

A pump device includes an electrical delivery pump, a first port for an air filter, a second port for a fuel tank, a valve opening, a connecting line, a bypass line, and an electrical switching valve. The connecting line connects the ports via the valve opening, which has a valve seat formed at the opening, a valve body receptacle, and a valve body configured to interact with the seat and adjustable in a direction of the seat by a delivery flow of the delivery pump. The bypass line branches off from the connecting line upstream of the opening, and has a throttled bypass outlet opening into the connecting line downstream of the opening. The switching valve has an electrical actuator, for example a magnet coil, operable to move the body. Such a pump device requires less structural space and reduced production costs relative to conventional pump devices.

13 Claims, 10 Drawing Sheets

(56) References Cited

U.S. PATENT DOCUMENTS

| | | | | |
|---|---|---|---|---|
| 9,097,216 B2* | 8/2015 | Itoh | F02M 25/0854 | |
| 2005/0022588 A1* | 2/2005 | Hayakawa | F02M 25/0809 | 73/114.41 |
| 2005/0047936 A1* | 3/2005 | Inagaki | F02M 25/0809 | 417/410.3 |
| 2006/0144370 A1* | 7/2006 | Iihoshi | F02M 25/0809 | 123/491 |
| 2007/0051168 A1* | 3/2007 | Kato | F02M 25/0809 | 73/49.7 |
| 2014/0013944 A1* | 1/2014 | Haag | F02M 25/0818 | 95/146 |
| 2015/0090235 A1* | 4/2015 | Pearce | F02M 25/0818 | 123/520 |
| 2016/0061155 A1* | 3/2016 | Takagi | F02M 25/089 | 73/40.5 R |

* cited by examiner

PUMP DEVICE FOR BUILDING UP PRESSURE IN A FUEL TANK

This application claims priority under 35 U.S.C. § 119 to patent application no. DE 10 2016 224 171.0, filed on Dec. 5, 2016 in Germany, the disclosure of which is incorporated herein by reference in its entirety.

The disclosure relates to a pump device.

BACKGROUND

A pump device is already known from DE197 35 549 B4, having an electrical delivery pump, having a first port for connection to an air filter, having a second port for connection to a fuel tank, having a connecting line which connects the first port to the second port via a first valve opening, and having a bypass line which branches off from the connecting line upstream of the first valve opening and which opens into the connecting line downstream of the first valve opening via a throttled bypass outlet. Here, at the first valve opening, there is formed a first valve seat which interacts with a valve body arranged movably in a valve body receptacle. The pump device comprises an electrical switching valve which has an electrical actuator, for example a magnet coil, for moving the valve body.

SUMMARY

The pump device according to the disclosure has the advantage in relation thereto that, instead of the electrical actuator, the delivery flow of the electrical delivery pump is utilized to open or close the first valve opening. Since the electrical actuator as an additional component is omitted, the production costs of the pump device are reduced. Furthermore, as a result of the omission of the actuator, the structural space of the pump device is reduced, and the noises of the pump device are reduced. This is achieved according to the disclosure by virtue of the delivery pump being arranged such that the valve body is adjustable in the direction of the first valve seat by the delivery flow of the delivery pump. In this way, the function of the adjustment of the valve body is integrated into the electrical delivery pump and into the actuation thereof.

Advantageous refinements and improvements of the pump device are possible by means of the measures specified in the description, claims, and drawings.

It is particularly advantageous if the pressure of the delivery pump can be conducted via a control line to a surface, averted from the first valve seat, of the valve body. In this way, a dynamic pressure acts on the valve body, which forces the valve body in the direction of the first valve seat.

It is also advantageous if an outlet of the delivery pump is connected in terms of flow via the control line to the valve body receptacle. In this way, the delivery flow of the delivery pump acts directly on the valve body, such that the latter performs a stroke in the direction of the first valve seat.

It is furthermore advantageous if the control line is a bypass line which branches off from a first section of the connecting line between the first port and the first valve opening and which opens into a second section of the connecting line between the second port and the first valve opening. In this way, the delivery pump can draw in air via the first port, such that no third port is required for the inlet of the delivery pump, and a very compact pump device is realized which requires little structural space.

It is advantageous if the valve body is movable along a valve axis between the first valve seat and a stop formed on the valve body receptacle. In this way, the valve body can be moved from to the stop as far as the first valve seat by the delivery flow of the delivery pump. The valve body receptacle and the first valve seat are for example arranged concentrically with respect to the valve axis.

It is furthermore advantageous if a spring element, in particular a helical spring, a diaphragm or a corrugated bellows, is provided, which acts on the valve body with a returning action in the direction of the stop. In this way, after the deactivation of the delivery pump, the valve body is quickly returned to the stop, and thus a fast opening-up of the full cross section of the first valve opening can be achieved.

It is highly advantageous if at least one second valve opening is provided, by means of which a flow connection from the control line into the second section of the connecting line can be controlled in a manner dependent on a position of the valve body in the valve body receptacle. The at least one second valve opening leads to a reduced dynamic pressure on the valve body, and should therefore be designed such that the dynamic pressure on the valve body is still sufficient to move the valve body against the first valve seat.

In one advantageous embodiment, at least two second valve openings are provided which are arranged in series in the axial direction with respect to the valve axis and which interact with the valve body receptacle or the valve body, wherein that second valve opening which opens first as viewed in the opening direction of the valve body is smaller than the at least one further second valve opening. The smaller second valve opening serves for performing a reference measurement with the delivery pump. In the case of said reference measurement, a delivery flow of the delivery pump is delivered via the smaller of the two second valve openings into the connecting line, and in the process, the current intensity of the delivery pump is measured and evaluated in order to be able to infer the volume flow variance of the delivery pump 3. During the reference measurement, the first valve opening can be opened. To perform a tank leakage diagnosis, the delivery flow of the delivery pump is, with the first valve opening closed, conducted via both second valve openings into the connecting line and from there via the second port into the fuel tank, in order to realize a pressure build-up there.

It is furthermore advantageous if a single second valve opening is provided, and the control line has a throttle outlet which opens into the second section of the connecting line and which is independent of the position of the valve body and which has a narrowed throttle opening. The throttle outlet serves for performing a reference measurement with the delivery pump. In the case of said reference measurement, a delivery flow of the delivery pump is delivered via the throttle opening into the connecting line, and in the process, the current intensity of the delivery pump is measured and evaluated in order to be able to infer the volume flow variance of the delivery pump. During the reference measurement, the first valve opening can be opened. To perform a tank leakage diagnosis, the delivery flow of the delivery pump is, with the first valve opening closed, conducted via the second valve opening and the throttle opening into the connecting line and from there via the second port into the fuel tank, in order to realize a pressure build-up there.

It is also advantageous if a section of the bypass line, which section faces towards the valve body receptacle, is formed as an elastic corrugated bellows which is fastened by one end to the valve body and by the other end to an opening of the bypass line. The function of the spring element for the return movement of the valve body is thus integrated in the bypass line 11. Furthermore, in this way, the valve body 13 is coupled to the corrugated bellows 18. The pressure of the delivery pump 3 is conducted via the bypass line 11 and the corrugated bellows 18 to that side of the valve body 13 which is averted from the first valve opening 10.

In an advantageous second exemplary embodiment, the control line is connected to the second section of the connecting line exclusively via a throttle outlet which opens into the second section of the connecting line and which is independent of the position of the valve body. In this way, the pump device is of particularly simple construction.

It is furthermore advantageous if the valve body comprises a piston or hollow piston, because good mechanical guidance of the valve body in the valve body receptacle is achieved in this way.

BRIEF DESCRIPTION OF THE DRAWINGS

Exemplary embodiments of the disclosure are illustrated in simplified form in the drawing and are discussed in more detail in the following description.

DETAILED DESCRIPTION

Figure 1:
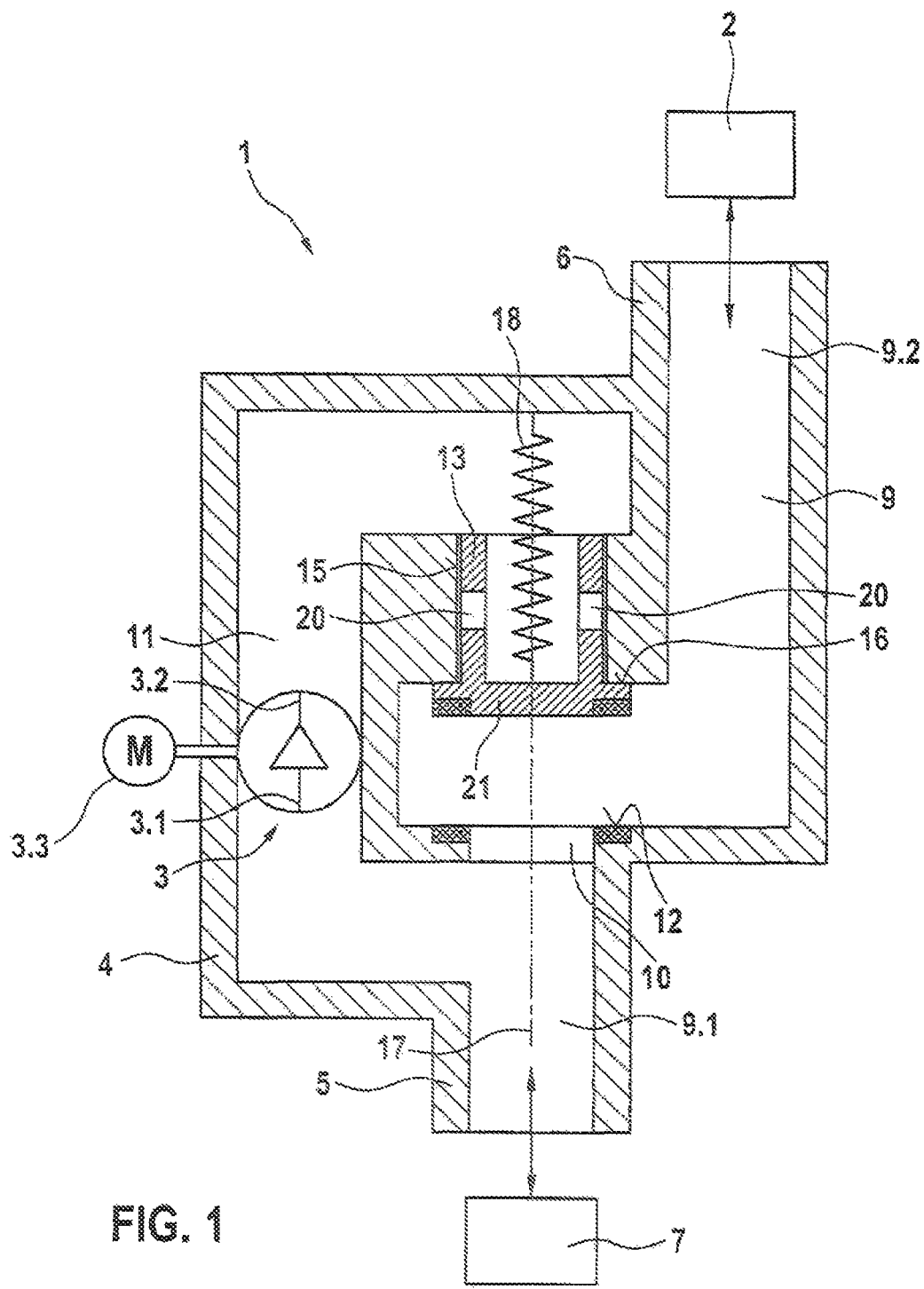
FIG. 1 shows a sectional simplified illustration of a pump device according to a first exemplary embodiment.

FIG. 1 shows a sectional simplified illustration of a pump device according to a first exemplary embodiment.

The pump device 1 serves for performing a tank leakage diagnosis, in the case of which a fuel tank 2 of a vehicle is checked for a leak. For this purpose, the pump device 1 has an electrical delivery pump 3, by means of the delivery or volume flow of which a pressure build-up in the fuel tank 2 can be realized. A housing 4 of the pump device 1 has a first port 5 for connection to the atmosphere 7, for example via an air filter, and a second port 6 for connection to the fuel tank 2, for example indirectly via an activated carbon filter. Via the first port 1, the pump device 1 can draw fresh air, in particular filtered, from the atmosphere and deliver it into the fuel tank 2 for the purposes of building up pressure. Furthermore, in the housing 4, there is provided a connecting line 9 which connects the first port 5 to the second port 6 via a first valve opening 10. The first valve opening 10 has a first valve seat 12, which interacts with a valve body 13 which is arranged movably in a valve body receptacle 15 of the housing 4. When the valve body 13 bears against the first valve seat 12, the first valve opening 10 is sealingly closed.

According to the disclosure, it is provided that the delivery pump 3 is arranged such that the valve body 13 is adjustable in the direction of the first valve seat 12 by the delivery flow of the delivery pump 3. This is achieved in that, during the operation of the delivery pump 3, the pressure of the delivery pump 3 acts on a surface, averted from the first valve seat 12, of the valve body 13. In this way, the first valve opening 10 can be closed through the operation of the delivery pump 3 alone.

A pneumatic adjustment of the valve body 13 is thus achieved by means of the delivery pump 3. The delivery pump 3 thus performs the two functions of closing and opening the first valve opening 10 and of providing a delivery flow for building up pressure in the fuel tank 2. After the first valve opening 10 has been closed, the operation of the delivery pump 3 is continued such that the first valve opening 10 remains closed and its delivery flow is conducted via the second valve opening 20 for the purposes of building up pressure in the fuel tank 2. The delivery pump 3 itself is driven by a drive 3.3, for example an electric motor.

Outlet 3.2 of the delivery pump 3 is connected in terms of flow via a control line 11 to the valve body receptacle 15, such that the pressure of the delivery pump is conducted onto that surface of the valve body 13 which is averted from the first valve seat 12. According to FIG. 1, the control line 11 is a bypass line, which branches off from a first section 9.1 of the connecting line 9 between the first port 5 and the first valve opening 10 and which opens into a second section 9.2 of the connecting line 9 between the second port 6 and the first valve opening 10. In this embodiment, the inlet 3.1 of the delivery pump 3 is connected in terms of flow to that section of the bypass line 11 which branches off from the first section 9.1 of the connecting line 9. In this way, the bypass line 11 runs via the inlet 3.1 and the outlet 3.2 of the delivery pump 3.

The bypass line 11 leads, downstream of the delivery pump 3, into the valve body receptacle 15, in which the valve body 13 is movably mounted. The valve body 13 is movable along a valve axis 17 between the first valve seat 12 and a stop 16 formed on the valve body receptacle 15. The valve body receptacle 15 and the first opening 10 are arranged opposite one another such that the axes of symmetry thereof lie jointly on the valve axis 17. The valve body receptacle 15 and the first valve opening 10 are thus arranged concentrically.

The return movement of the valve body 13 in the direction of the stop 16 is realized for example by means of a spring element 18 which, in the first exemplary embodiment, is a tension spring, for example a helical tension spring, and acts on the valve body 13 with a returning action in the direction of the stop 16. The tension spring 18 is arranged in the bypass line 11 and is fastened by one end to the housing 4 and by the other end to the valve body 13. The spring element 18 may however also be a compression spring. Alternatively, the spring element 18 may be omitted and the valve body 13 may be returned under the action of its own weight alone.

On the pump device 1, there is provided at least one second valve opening 20 by means of which a flow connection from the bypass line 11 into the second section 9.2 of the connecting line 9 can be controlled in a manner dependent on a position of the valve body 13 in the valve body receptacle 15.

In the first exemplary embodiment, the valve body 13 is formed as a hollow piston, on which at least one second valve opening 20 is provided. The hollow piston has a hollow chamber which, at that face side of the valve body 13 which is averted from the first valve seat 12, is open toward the bypass line 11, and which, at the other face side, is closed.

The at least one second valve opening 20 is controlled by means of the interaction with the valve body receptacle 15, that is to say for example is opened when the at least one valve opening 20 protrudes out of the valve body receptacle 15 into the connecting line 9. For this purpose, the at least one second valve opening 20 is provided as a passage opening on the circumference of the hollow piston.

In the first exemplary embodiment, a plate section 21 which interacts with the valve seats 12, 16 is provided on the hollow piston of the valve body 13. The stop 16 is provided on that face side of the housing 4 or of the valve body receptacle 15 which faces toward the plate section 21 of the valve body 13.

Figure 2:
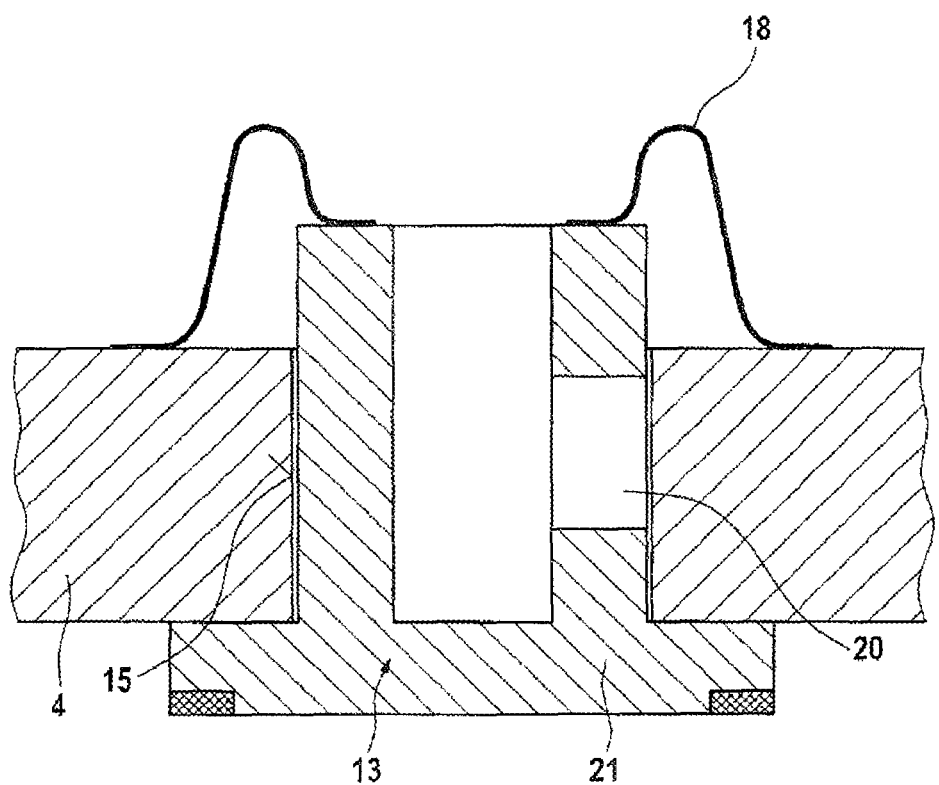
FIG. 2 shows the valve body as per FIG. 1 with an alternative spring element.

As an alternative to the valve spring 18 as per FIG. 1, it is possible, as per FIG. 2, for an elastically resilient diaphragm 18 to be provided which returns the valve body 13 against the stop 16. For this purpose, an inner edge region of the diaphragm 18 is fastened to the valve body 13, and an outer edge region of the diaphragm 18 is fastened to the housing 4 of the pump device 1.

Figure 3:
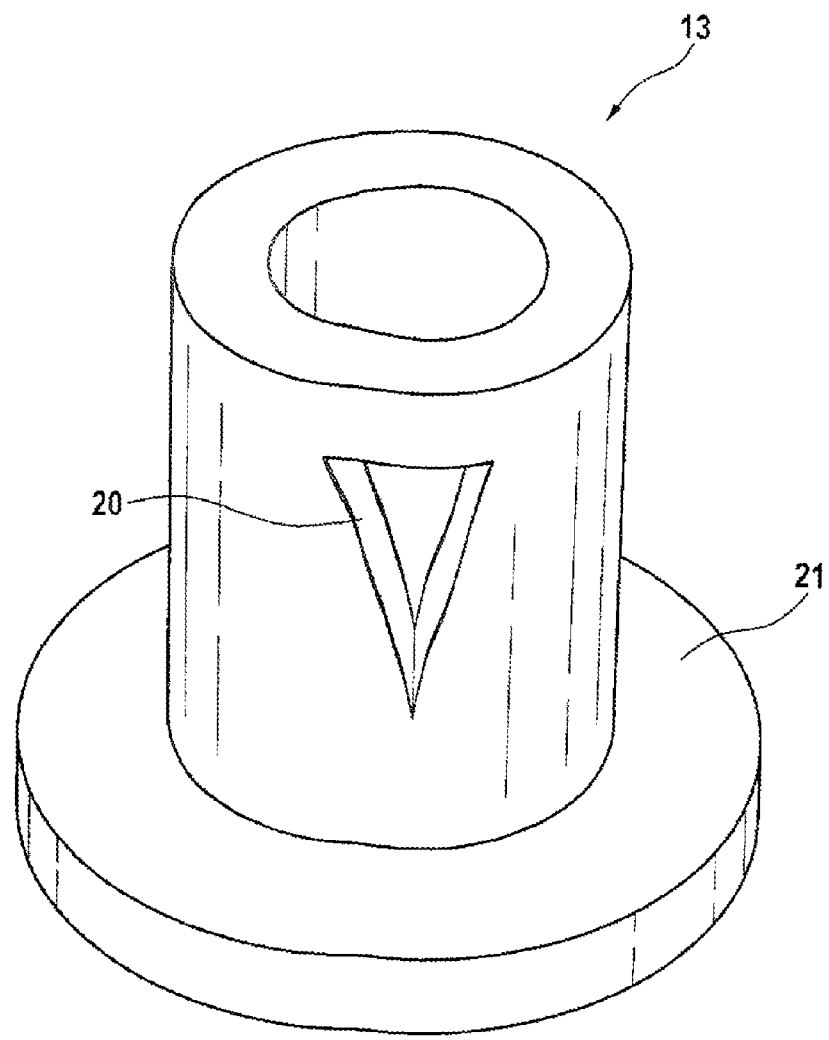
FIG. 3 shows an alternative embodiment of the valve body as per FIG. 1 or FIG. 2.

In the embodiment as per FIG. 3, at least one second valve opening 20, for example a single second valve opening 20, may be provided on the valve body 13, the opening cross section of which widens in continuous fashion in an opening direction running toward the first valve opening 10.

Figure 4:
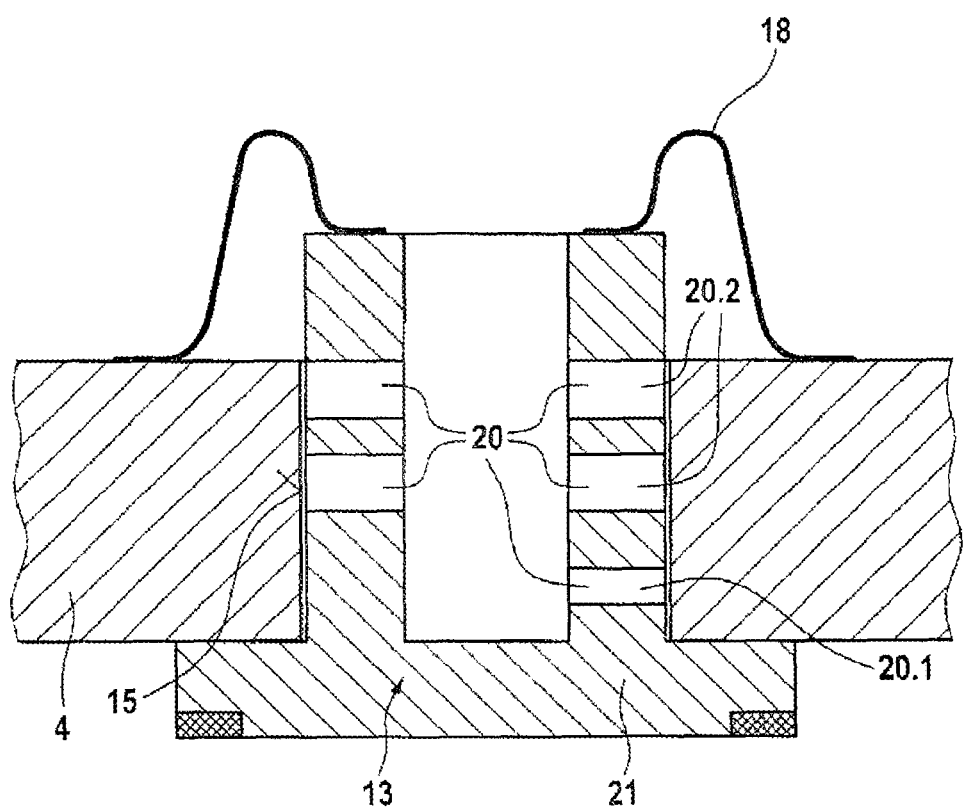
FIG. 4 shows a further alternative embodiment of the valve body as per FIG. 1 or FIG. 2.

In the embodiment as per FIG. 4, the valve body 13 has at least two, for example three, second valve openings 20 arranged in series in an axial direction with respect to the valve axis 17, which valve openings interact with the valve body receptacle 15, wherein that second valve opening 20.1 which opens first as viewed in the opening direction of the valve body 13 is smaller than the at least one further second valve opening 20.2. To perform a reference measurement, the delivery pump 3 is operated with a certain voltage such that the valve body 13 protrudes out of the valve body receptacle 15 only to such an extent that only the relatively small second valve opening 20.1 is open.

Figure 5:
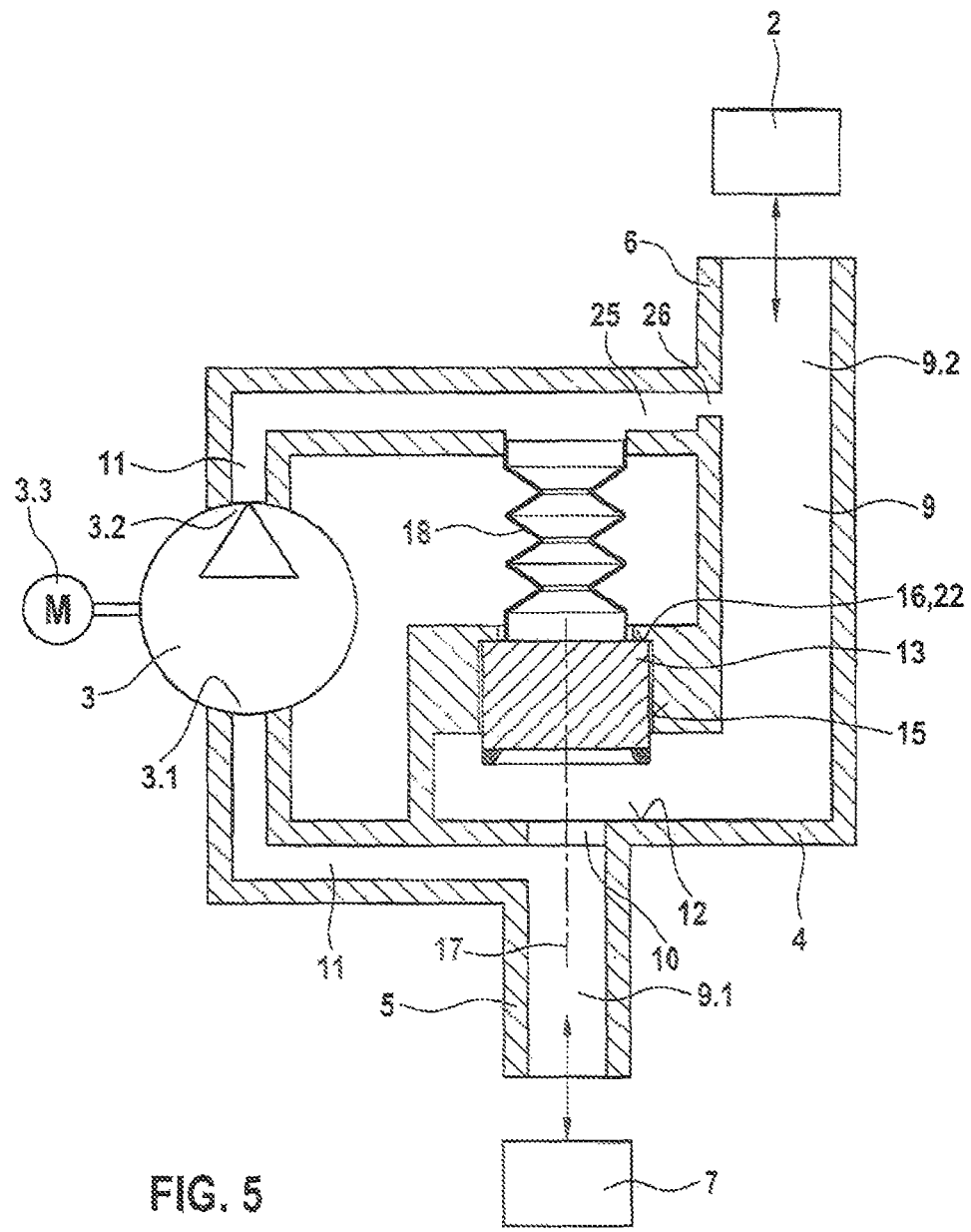
FIG. 5 shows a sectional simplified illustration of a pump device according to a second exemplary embodiment.

FIG. 5 shows a sectional simplified illustration of a pump device according to a second exemplary embodiment.

In the second exemplary embodiment as per FIG. 5, those parts which are identical or of identical action in relation to the first exemplary embodiment as per FIG. 1 are denoted by the same reference designations.

The second exemplary embodiment differs from the first exemplary embodiment in that a section of the bypass line 11, which section faces toward the valve body receptacle 15, is formed as an elastic corrugated bellows which is fastened by one end to the valve body 13 and by the other end to an opening of the bypass line 11. The function of the spring element 18 is thus integrated in the bypass line 11, and the valve body 13 is coupled in this way to the corrugated bellows 18. The pressure of the delivery pump 3 is conducted via the bypass line 11 and the corrugated bellows 18 to that side of the valve body 13 which is averted from the first valve opening 10. A further difference consists in that the valve body 13 is not formed as a hollow piston and does not have a second valve opening 20. Instead, the valve body 13 is formed as a piston composed of solid material or as a piston with an enclosed cavity. Thus, in the second exemplary embodiment, the valve body 13 controls only the first valve opening 10 and no second valve opening 20. In order that the delivery pump 3 can charge the fuel tank 2 with pressure, the bypass line 11 has a throttle outlet 25 which opens into the second section 9.2 of the connecting line 9 and which is independent of the position of the valve body 13 and which has a narrowed throttle opening 26.

The control line 11 is thus connected to the second section 9.2 of the connecting line 9 exclusively via the throttle outlet 25, 26.

During the operation of the delivery pump 3, the pressure of the delivery pump 3 acts on the valve body 13 such that the valve body 13 is moved against the first valve seat 12 and sealingly closes the first valve opening 10. Via the throttle opening 26, a delivery flow of the delivery pump 3 flows into the connecting line 9 and from there into the fuel tank 2. The throttle opening 26 should be designed such that the dynamic pressure on the valve body 13 as generated by the delivery pump 3 is sufficient to hold the first valve opening 10 closed while a tank leak diagnosis is being performed.

Since the valve body 13 does not have a plate section 21 as in FIG. 1, the stop 16 is provided on a shoulder 22 of the valve body receptacle 15, which shoulder is formed at an end, averted from the first valve opening 10, of the valve body receptacle 15.

Figure 6:
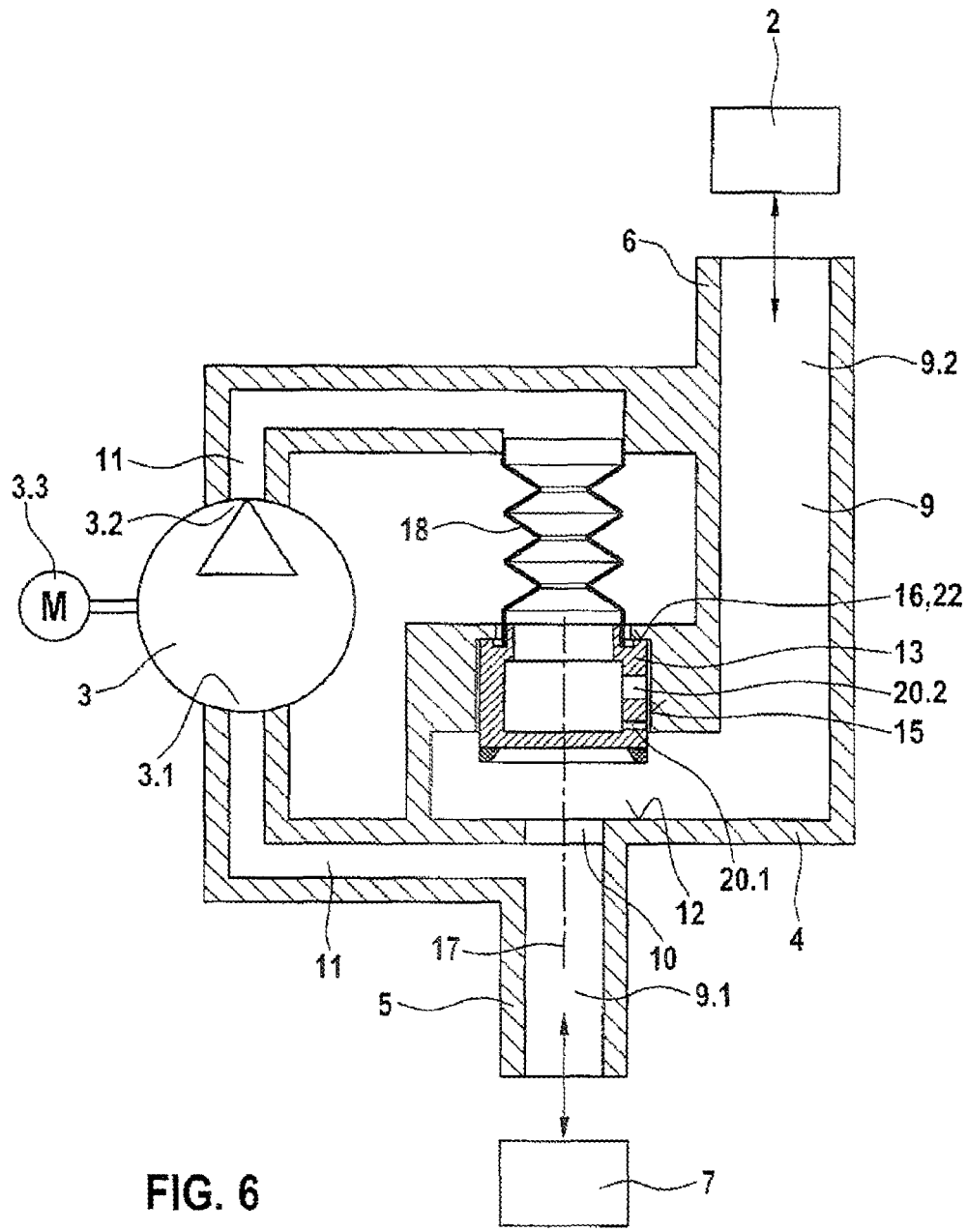
FIG. 6 shows a sectional simplified illustration of a pump device according to a third exemplary embodiment.

FIG. 6 shows a sectional simplified illustration of a pump device according to a third exemplary embodiment.

In the third exemplary embodiment as per FIG. 6, those parts which are identical or of identical action in relation to the first and second exemplary embodiments as per FIG. 1 and FIG. 5 are denoted by the same reference designations.

In the third exemplary embodiment as per FIG. 6, it is the case as per FIG. 5 that a section of the bypass line 11, which section faces toward the valve body receptacle 15, is formed as an elastic corrugated bellows which is fastened by one end to the valve body 13 and by the other end to an opening of the bypass line 11. The function of the spring element 18 is thus integrated in the bypass line 11, and the valve body 13 is coupled in this way to the corrugated bellows 18. The pressure of the delivery pump 3 is conducted via the bypass line 11 and the corrugated bellows 18 to that side of the valve body 13 which is averted from the first valve opening 10. The valve body receptacle 15 is also designed as in the second exemplary embodiment.

The third exemplary embodiment however differs in relation to the second exemplary embodiment in that the valve body 13 is formed as a hollow piston which, on its circumference, has at least one second valve opening 20, for example two valve openings 20, as passage opening. The second valve openings 20 formed on the valve body 13 interact with the valve body receptacle 15, such that the valve body 13 controls, that is to say opens or closes, the second valve openings 20 in a manner dependent on its position in the valve body receptacle 15.

Figure 7:
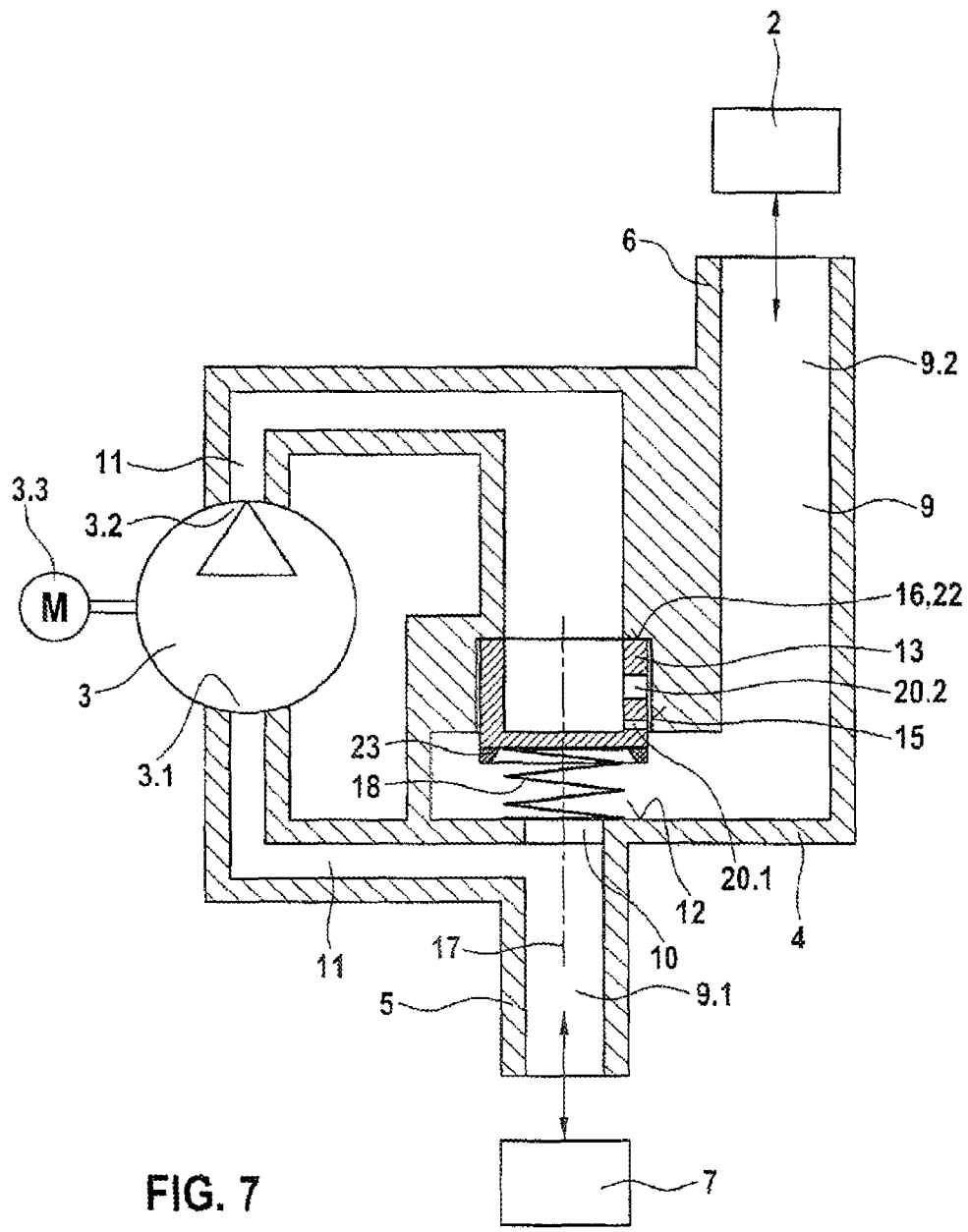
FIG. 7 shows a sectional simplified illustration of a pump device according to a fourth exemplary embodiment.

FIG. 7 shows a sectional simplified illustration of a pump device according to a fourth exemplary embodiment.

In the fourth exemplary embodiment as per FIG. 7, those parts which are identical or of identical action in relation to the first to third exemplary embodiments as per FIG. 1, FIG. 5 and FIG. 6 are denoted by the same reference designations.

The fourth exemplary embodiment differs from the first exemplary embodiment as per FIG. 1 in that the spring element 18 is formed not as a tension spring but as a compression spring, for example as a helical compression spring, and is arranged in the connecting line 9 between the first valve seat 12 and the valve body 13. The compression spring 18 is supported by one end on the housing 4 and acts by the other end with a returning action on the valve body 13. In order that the valve body 13 can close the first valve opening 10 despite the compression spring 18 arranged in the region of the first valve opening 10, a ring-shaped projection 23 is provided on the valve body 13, which projection surrounds the compression spring 18 and can fully receive said compression spring in the compressed state. The projection 23 may for example be a sealing element which interacts sealingly with the first valve seat 12.

Furthermore, bypass line 11 leads, without an elastic corrugated bellows section, into the valve body receptacle 15. The position of the valve body 13 in the valve body receptacle 15 is dependent on the force equilibrium between the pressure force of the delivery pump 3 and the spring force of the compression spring 18.

As in the first or third exemplary embodiment, the valve body 13 may be formed as a hollow piston, and has for example two valve openings 20, 20.1, 20.2 arranged in series in an axial direction. The valve body receptacle 15 is designed as in the second or third exemplary embodiment.

Figure 8:
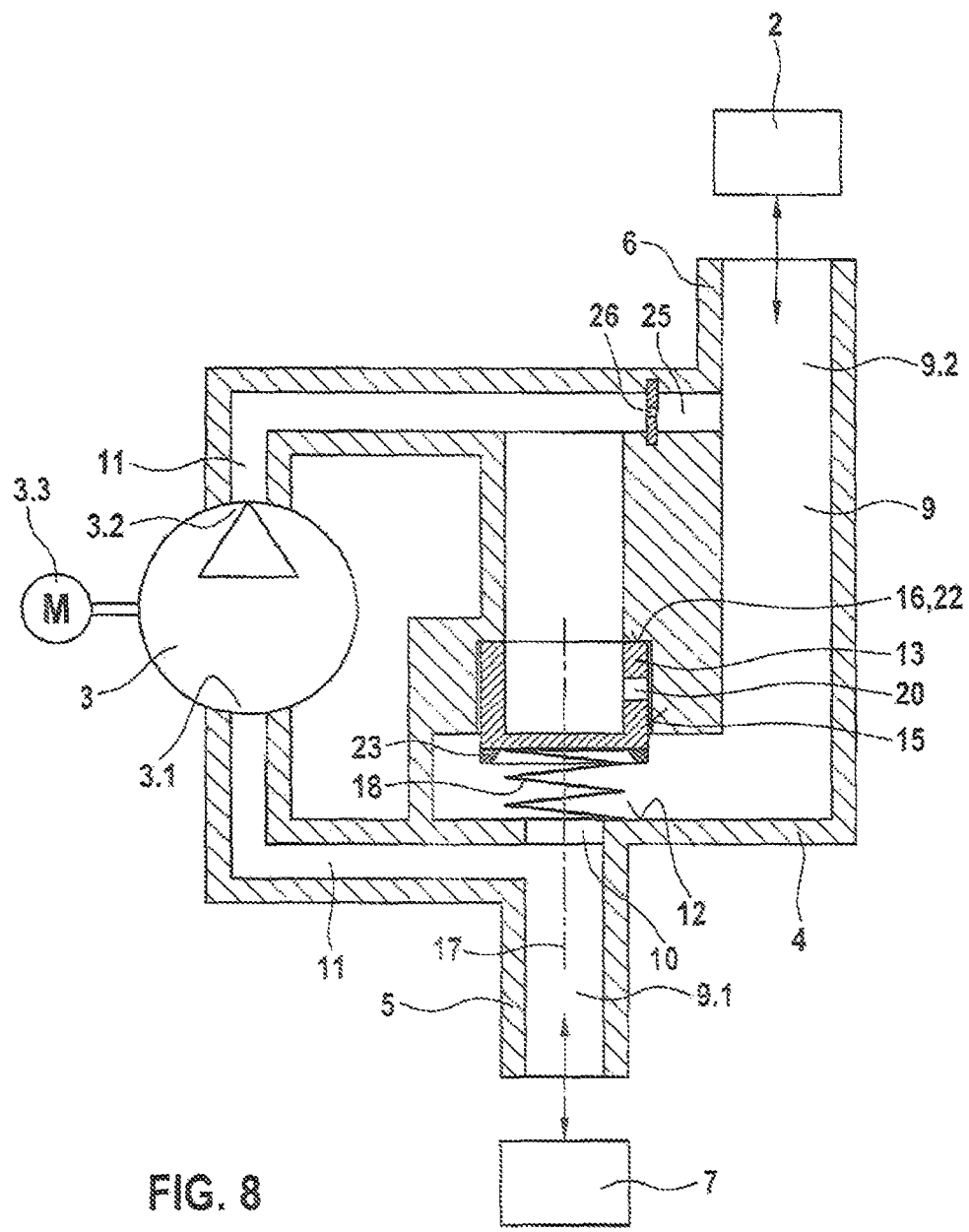
FIG. 8 shows a sectional simplified illustration of a pump device according to a fifth exemplary embodiment.

FIG. 8 shows a sectional simplified illustration of a pump device according to a fifth exemplary embodiment.

In the fifth exemplary embodiment as per FIG. 8, those parts which are identical or of identical action in relation to the first to fourth exemplary embodiments as per FIG. 1 and FIG. 5 to FIG. 7 are denoted by the same reference designations.

The fifth exemplary embodiment differs from the fourth exemplary embodiment in that a single second valve opening 20 is provided on the valve body 13, and the bypass line 11 has the throttle outlet 25 which opens into the second section 9.2 of the connecting line 9 and which is independent of the position of the valve body 13 and which has the narrowed throttle opening 26. The second valve opening 20 serves for a fast pressure build-up in the fuel tank 2, and may also be omitted.

As in the third and fourth exemplary embodiments, the valve body 13 is formed as a hollow piston. The spring element 18 is arranged, for example as a helical compression spring, in the connecting line 9, such that the bypass line 11 leads, without an elastic corrugated bellows section, into the valve body receptacle 15. The valve body receptacle 15 is formed as in the second, third or fourth exemplary embodiment.

Figure 9:
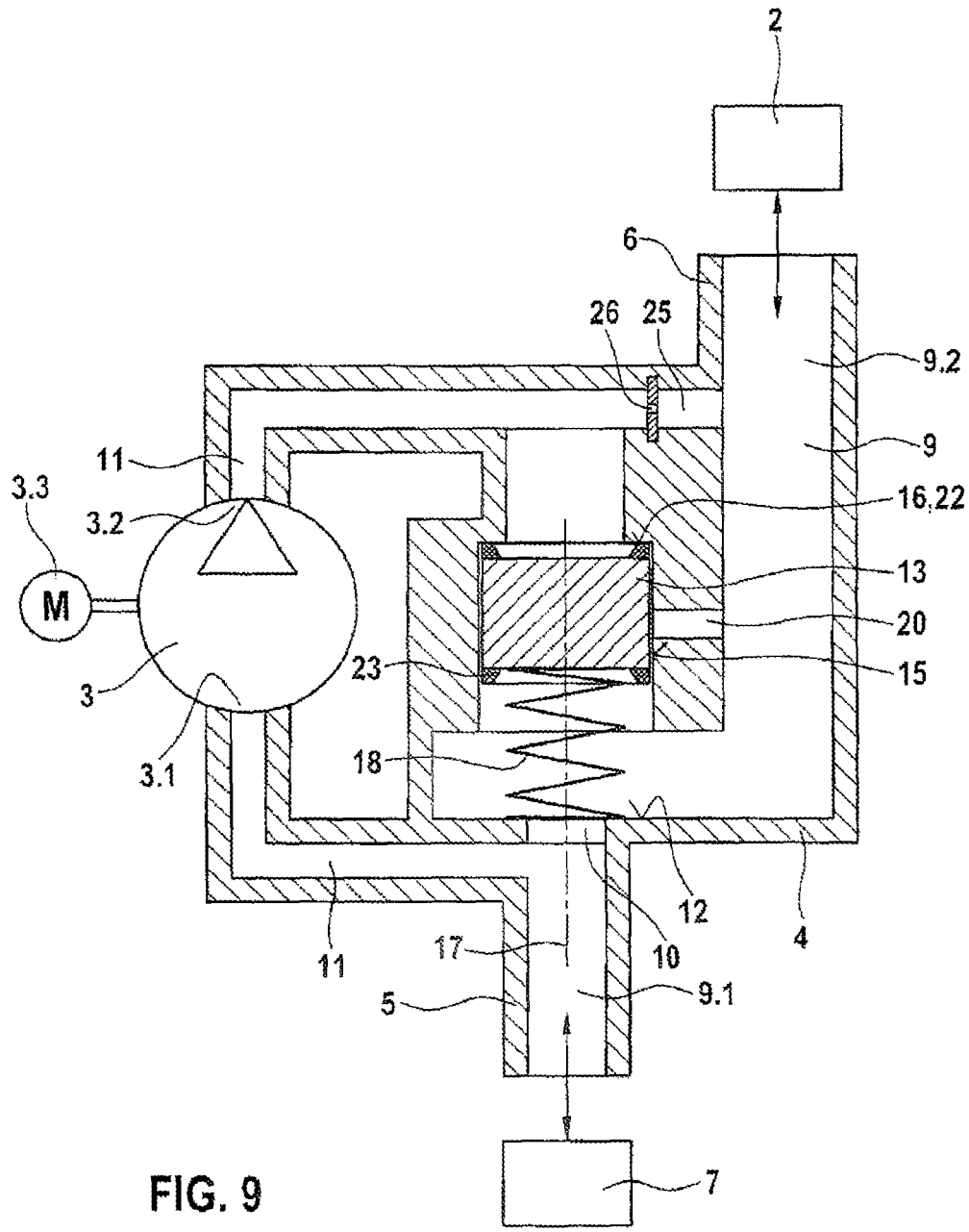
FIG. 9 shows a sectional simplified illustration of a pump device according to a sixth exemplary embodiment.

FIG. 9 shows a sectional simplified illustration of a pump device according to a sixth exemplary embodiment.

In the sixth exemplary embodiment as per FIG. 9, those parts which are identical or of identical action in relation to the first to fifth exemplary embodiments as per FIG. 1 and FIG. 5 to FIG. 8 are denoted by the same reference designations.

The sixth exemplary embodiment differs from the fifth exemplary embodiment in that the single second valve opening 20 is provided not on the valve body 13 but on the valve body receptacle 15 of the housing 4. The second valve opening 20 interacts with the valve body 13 and is at least partially opened or closed in a manner dependent on the position of the valve body. Here, the second valve opening 20 leads from the valve body receptacle 15 into the second section 9.2 of the connecting line 9. The valve body 13 is for example produced with solid material, though may also have an enclosed cavity.

The stop 16 is provided on the shoulder 22 of the valve body receptacle 15, which shoulder is formed at that end of the valve body receptacle 15 which is averted from the first valve opening 10.

The bypass line 11 additionally comprises the throttle outlet 25 which opens into the second section 9.2 of the connecting line 9 and which is independent of the position of the valve body 13 and which has the narrowed throttle opening 26. The spring element 18 is arranged for example as a helical compression spring in the second section 9.2 of the connecting line 9. The second valve opening 20 serves for a fast pressure build-up in the fuel tank 2, and may also be omitted.

Figure 10:
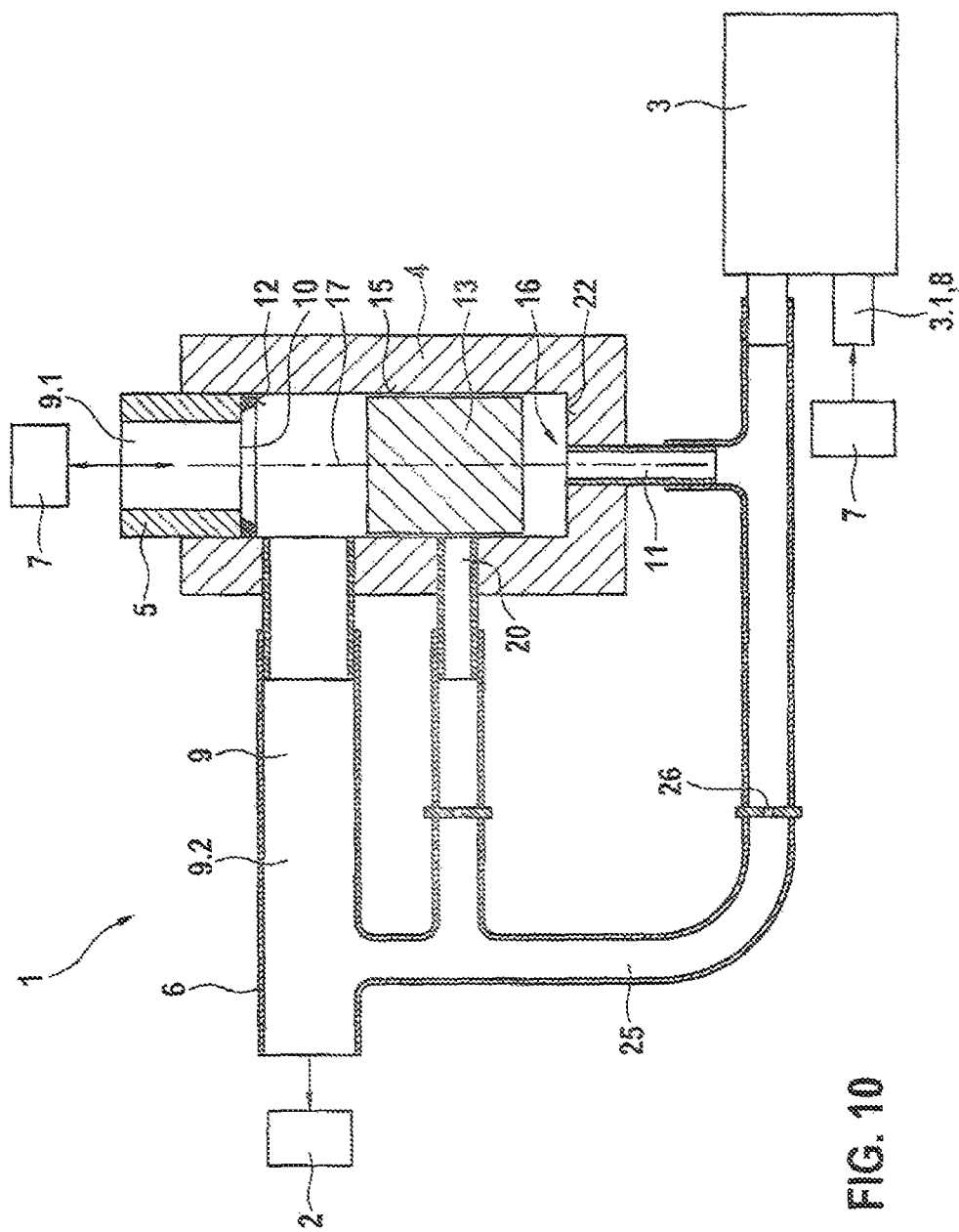
FIG. 10 shows a sectional simplified illustration of a pump device according to a seventh exemplary embodiment.

FIG. 10 shows a sectional simplified illustration of a pump device according to a seventh exemplary embodiment.

In the seventh exemplary embodiment as per FIG. 10, those parts which are identical or of identical action in relation to the first to fifth exemplary embodiments as per FIG. 1 and FIG. 5 to FIG. 9 are denoted by the same reference designations.

The seventh exemplary embodiment differs from the other exemplary embodiments in that the control line 11 is formed not as a bypass line but as a separate line which is duly connected in terms of flow via the throttle outlet 25 to the second section 9.2 of the connecting line 9 but not to the first section 9.1 of the connecting line 9. Rather than drawing in the air out of the first port 5, the delivery pump 3 draws in air via its inlet 3.1 from the atmosphere 7. Here, the inlet 3.1 of the delivery apparatus 3 forms a third port 8. The control line 11 branches off, for example, and opens with a section into the valve body receptacle 15, and is connected in terms of flow via the throttle outlet 25 to the second section 9.2 of the connecting line 9. Alternatively, the port 3.1 of the delivery pump 3 may also be connected to the first port 5, and thus draw in air from the latter.

As in the sixth exemplary embodiment as per FIG. 9, the valve body receptacle 15 has, for example, a second valve opening 20 which interacts with the valve body 13 and which leads from the valve body receptacle 15 into the second section 9.2 of the connecting line 9, for example via the throttle outlet 25 downstream of the throttle opening 26. The valve opening 20 serves for a faster pressure build-up in the fuel tank 2, and may also be omitted.

The valve body 13 is produced for example from solid material, though may also have an enclosed cavity.

A valve spring 18 which returns the valve body 13 may be provided in this embodiment, but is for example omitted in this embodiment.

The above-described pump devices may be operated in a reference mode or in a tank leak diagnosis mode. Before the tank leak diagnosis is performed, the delivery pump can be operated in the reference mode with a first voltage such that the delivery flow, that is to say the volume flow of the delivery pump 3, passes exclusively via a reference leak into the connecting line 9. Depending on the exemplary embodiment, the reference leak may be the second valve opening 20.1 or the throttle opening 26 of the control line 11. During the reference measurement, the current intensity of the delivery pump is measured and evaluated in order to be able to infer the volume flow variance of the delivery pump 3. It is also possible for multiple reference measurements to be performed at different first voltages, whereby the pump quality of the delivery pump 3 can be determined with even greater accuracy.

To perform the tank leak diagnosis, the delivery pump 3 is operated in a tank leak diagnosis mode with a second voltage which is higher than the first voltage, such that the first valve opening 10 is sealingly closed by the valve body 13 and the delivery flow of the delivery pump is conducted via the second port 2 into the fuel tank 2 for inspection. Here, the delivery flow may pass via the at least one second valve opening 20 and/or via the throttle opening 26 of the throttle outlet 25 into the connecting line 9 and from there into the fuel tank 2. During the tank leak diagnosis mode, the profile of the current intensity of the delivery pump 3 is measured, evaluated and compared with a reference characteristic curve. If the measured current intensity is greater than the respective reference value, no leak is present because, owing to the absence of a leak, a high counterpressure against which delivery pump 3 must operate builds up in the fuel tank 2. If the measured current intensity is lower than the respective reference value, a leak is present because, owing to the leak, no correspondingly high counterpressure against which delivery pump 3 must operate builds up in the fuel tank 2.

A pressure sensor 28 may be provided which measures the pressure in the control line 11, in the valve body receptacle 15 or in the fuel tank 2. The pressure sensor 28 may be provided alternatively or in addition to the measurement, performed in the reference mode and in the tank leak diagnosis mode, of the current intensity of the delivery pump 3.

The switching from the first voltage to the second voltage may be performed in stepped or continuous fashion. The continuous increase of the voltage to the value of the second voltage has the advantage that the valve body 13 is moved softly against the first valve seat 12, such that the closure of the first valve opening 10 is not audible, and thus the switching noises of the apparatus are reduced.

What is claimed is:

1. A pump device for building up pressure in a fuel tank, comprising:
    a first port configured to connect to an atmosphere;
    a second port configured to connect to a fuel tank;
    a first valve opening including:
        a valve body receptacle;
        a valve body movably positioned in the valve body receptacle; and
        a first valve seat configured to interact with the valve body;
    a connecting line that connects the first port to the second port via the first valve opening; and
    an electrical delivery pump configured such that a delivery flow of the delivery pump adjusts the valve body in a direction of the first valve seat.

2. The pump device of claim 1, further comprising:
    a control line configured to conduct a pressure of the delivery pump to a surface of the valve body averted from the first valve seat.

3. The pump device of claim 2, wherein:
    the delivery pump further includes an outlet;
    the control line connects the outlet to the valve body receptacle.

4. The pump device according to claim 3, wherein:
    the connecting line further includes:
        a first section between the first port and the first valve opening; and
        a second section between the first valve opening and the second port; and
    the control line is a bypass line branching off from the first section of the connecting line and opening into the second section of the connecting line.

5. The pump device according to claim 3, further comprising:
    a stop positioned on the valve body receptacle;
    wherein the valve body is movable along a valve axis between the first valve seat and the stop.

6. The pump device according to claim 5, further comprising:
    a spring element configured to act on the valve body in a direction of the stop.

7. The pump device according to claim 6, wherein the spring element includes a helical spring, a diaphragm, or a corrugated bellows.

8. The pump device of claim 4, further comprising:
    at least one second valve opening configured to control a flow connection between the second section of the connecting line to the bypass line based on a position of the valve body in the valve body receptacle.

9. The pump device according to claim 8, wherein:
    the at least one second valve opening is at least two second valve openings arranged along a valve axis in order of decreasing size in a direction toward an opening direction of the valve body; and
    the at least two second valve openings are configured to interact with the valve body receptacle or the valve body.

10. The pump device according to claim 8, wherein:
    the at least one second valve opening consists of a single second valve opening;
    the bypass line has a throttle outlet that opens into the second section of the connecting line; and
    the throttle outlet is independent of a position of the valve body, and has a narrowed throttle opening.

11. The pump device according to claim 4, wherein:
    the bypass line has an opening; and
    a section of the bypass line facing toward the valve body receptacle forms an elastic corrugated bellows having a first end fastened to the valve body and a second end fastened to the opening of the bypass line.

12. The pump device according to claim 11, further comprising:
    a throttle outlet that exclusively connects the bypass line to the second section of the connecting line, and that is independent of a position of the valve body.

13. The pump device according to claim 1, wherein the valve body includes a piston or a hollow piston.

* * * * *